United States Patent [19]

Ueda et al.

[11] Patent Number: 5,322,823
[45] Date of Patent: Jun. 21, 1994

[54] CERAMIC COMPOSITES AND PROCESS FOR ITS PRODUCTION

[75] Inventors: Hisao Ueda; Ryuichi Matsuki; Takeyoshi Takenouchi; Hiroshi Sasaki, all of Saitama; Koichi Niihara, 9-7-1142, Korigaoka, Hirakata-Shi, Osaka, Japan

[73] Assignees: Mitsubishi Materials Corp., Tokyo; Koichi Niihara, Osaka, both of Japan

[21] Appl. No.: 27,525

[22] Filed: Mar. 8, 1993

[51] Int. Cl.$^5$ .................. C04B 35/56; C04B 35/58
[52] U.S. Cl. ............................ 501/89; 501/87; 501/91; 501/92; 501/95; 501/97
[58] Field of Search ............ 501/89, 91, 92, 95, 501/97, 153, 87

[56] References Cited

U.S. PATENT DOCUMENTS

| | | | |
|---|---|---|---|
| 5,196,386 | 3/1993 | Furuse et al. | 501/89 |
| 4,063,908 | 12/1977 | Ogawa et al. | 501/153 |
| 4,543,345 | 9/1985 | Wei | 501/91 |
| 4,745,091 | 5/1988 | Landingham | 501/89 |
| 4,789,277 | 12/1988 | Rhodes et al. | 501/153 |
| 4,867,761 | 9/1989 | Brandt et al. | 501/153 |
| 4,961,757 | 10/1990 | Rhodes et al. | 501/89 |
| 5,059,564 | 10/1991 | Mehrotra et al. | 501/89 |
| 5,123,935 | 6/1992 | Kanamaru et al. | 501/91 |

Primary Examiner—Mark L. Bell
Assistant Examiner—Deborah Jones
Attorney, Agent, or Firm—Kanesaka & Takeuchi

[57] ABSTRACT

A ceramics composites prepared by dispersing any one of the following materials (i) to (viii) in $Al_2O_3$ which as a matrix-containing crystalline grains having a grain size of 0.5 to 100 $\mu$m. (i) 3 to 40% by volume of fine TiN particles having a particle size of not more than 2 $\mu$m and 3 to 40% by volume of fine SiC particles having a particle size of not more than 2 $\mu$m. (ii) 3 to 40% by volume of fine TiN particles having a particle size of not more than 2 $\mu$m and 3 to 40% by volume of fine $Si_3N_4$ particles having a particle size of not more than 2 $\mu$m. (iii) 2 to 35% by volume of fine TiC particles having a particle size of not more than 2 $\mu$m and 5 to 40% by volume of SiC whiskers having a diameter of 0.05 to 2 $\mu$m. (iv) 2 to 35% by volume of fine TiC particles having a particle size of not more than 2 $\mu$m and 5 to 40% by volume of $Si_3N_4$ whiskers having a diameter of 0.1 to 2 $\mu$m. (v) 3 to 40% by volume of fine TiN particles having a particle size of not more than 2 $\mu$m and 3 to 30% by volume of SiC whiskers having a diameter of 0.05 to 2 $\mu$m. (vi) 3 to 40% by volume of fine TiN particles having a particle size of not more than 2 $\mu$m and 3 to 30% by volume of $Si_3N_4$ whiskers having a diameter of 0.1 to 2 $\mu$m. (vii) 2 to 35% by volume of fine TiC particles having a particle size of not more than 2 $\mu$m and 5 to 40% by volume of fine SiC particles having a particle size of not more than 2 $\mu$m. (viii) 2 to 35% by volume of fine TiC particles having a particle size of not more than 2 $\mu$m and 5 to 40% by volume of fine $Si_3N_4$ particles having a particle size of not more than 2 $\mu$m.

6 Claims, No Drawings

CERAMIC COMPOSITES AND PROCESS FOR ITS PRODUCTION

BACKGROUND OF THE INVENTION AND RELATED ART STATEMENT

The present invention relates to ceramic composites having a special organizational structure and a process for manufacturing the same. More specifically it relates to ceramic composites having high toughness, high strength, thermal resistance and wear resistance. The present invention relates also to a process for manufacturing the same.

$Al_2O_3$ can be easily sintered and has excellent properties such as thermal resistance, corrosion resistance and electric insulation, and has long been used widely as an industrial material. However, it has defects of possessing low strength, low fracture toughness and low thermal shock resistance. Accordingly, attempts have been made to improve these disadvantages by making composites. The R & D on manufacturing composites, however were mostly concerned with how to achieve complexing in the micron level with particles (such as TiC) or whiskers (such as SiC whisker) dispersed as a second phase. Accordingly, there is a limit to the improvement of these mechanical properties. By making composite formations using these dispersed particles or whiskers, the fracture toughness is improved by crack deflection developed because of the maldistribution of the dispersed particles in the grain boundary of $Al_2O_3$, or the pulling of the whiskers. However, it is well known that in a grain dispersed composite, the cracks are deflected by the dispersed grains which are localized at the $Al_2O_3$ grain boundaries, and that the fracture toughess of the resulting sintered $Al_2O_3$ is thereby increased.

In a ceramic such as sintered $Al_2O_3$, the matrix thereof consists of anisotropic grains. Accordingly, the localized stresses generate at the grain boundaries by the thermal expansion mismatch between the matrix and dispersion, and the localized compressive stress is accumulated during cooling down from the sintering temperature. Then, this grain boundary becomes a fracture source which decreases the strength of the whole sintering. When fine particles are dispersed in a matrix it is expected that the toughness is improved, because those particles avoid propagation of the cracks. However a prior art technology that comprises dispersing those fine particles in the matrix was by no means effective in significantly increasing the strength, because there was no change in the grain boundaries which function as the source for fractures. Thus, the strength cannot be greatly increased.

OBJECT AND SUMMARY OF THE INVENTION

It is an object of the present invention to overcome the prior art problems mentioned hereinbefore, and to provide ceramic composites having high toughness and strength. Another object of the present invention is to provide ceramic composites having considerably improved mechanical properties of $Al_2O_3$ at room temperature and at high temperatures. Still another object of this invention is to provide a ceramic material having high toughness and strength which is greatly improved in its resistance to fracture at the time of use, inhibits abnormal grain growth of $Al_2O_3$, controls organizational structure such as the fineness of the organization and makes a composite of $Al_2O_3$ particles, and which has excellent thermal shock resistance as a thermally resistance material, a weat resistant material, a cutting tool material, a high temperature structural material and an electronic ceramic material.

Ceramic composites in accordance with the first invention of this application are characterized in that 3 to 40% by volume of fine TiN particles 2 μm or less in particle size and 3 to 40% by volume of fine SiC particles 2 μm or less in particle size are dispersed within $Al_2O_3$ matrix particles having crystalline grains from 0.5 to 100 μm in grain size.

A method for producing the above ceramic composite material in accordance with the second invention of this application comprises of mixing $Al_2O_3$ particles 5 μm or less in particle size, 3 to 40% by volume of fine TiN particles 2 μm or less in particle size and 3 to 40% by volume of fine SiC particles 2 μm or less in particle size and then sintering the molding obtained from the resulting mixture at a sintering temperature of 1500° C. or higher.

Ceramic composites in accordance with a third invention of this application are characterized in that 3 to 40% by volume of fine TiN particles 2 μm or less in particle size and 3 to 40% by volume of fine $Si_3N_4$ particles 2 μm or less in particle size are dispersed within $Al_2O_3$ matrix particles having crystalline grains from 0.5 to 100 μm in grain size.

A method for producing the above ceramic composite material in accordance with a fourth invention of this application comprises of mixing $Al_2O_3$ particles 5 μm or less in particle size, 3 to 40% by volume of fine TiN particles 2 μm or less in particle size and 3 to 40% by volume of fine $Si_3N_4$ particles 2 μm or less in particle size and then sintering the material obtained from the resulting mixture at a sintering temperature 1500° C. or higher.

Ceramic composites in accordance with a fifth invention of this application are characterized in that 2 to 35% by volume of fine TiC particles 2 μm or less in particle size and 5 to 40% by volume of SiC whiskers having a diameter of 0.05 to 2 μm are dispersed in $Al_2O_3$ matrix particles having crystalline grains from 0.5 to 100 μm in grain size.

A method for producing the above ceramic composite in accordance with a sixth invention of this application comprises of mixing $Al_2O_3$ particles 5 μm or less in particle size, 2 to 35% by volume of fine TiC particles 2 μm or less in particle size and 5 to 40% by volume of SiC whiskers having a diameter of 0.05 to 2 μm, and then sintering the molding obtained from the resulting mixture at a sintering temperature of 1500° C. or higher.

Ceramic composites in accordance with a seventh invention are characterized in that 2 to 35% by volume of fine TiC particles 2 μm or less in particle size and 5 to 40% by volume of $Si_3N_4$ whiskers having a diameter of 0.1 to 2 μm are dispersed in $Al_2O_3$ matrix particles having crystalline grains 0.5 to 100 μm in grain size.

A method for producing the above ceramic composite in accordance with an eighth invention of this application comprises of mixing $Al_2O_3$ particles 5 μm or less in particle size, 2 to 35% by volume of fine TiC particles 2 μm or less in particle size and 5 to 40% by volume of $Si_3N_4$ whiskers having a diameter of 0.1 to 2 μm and then sintering the molding obtained from the resulting mixture, at a sintering temperature of 1500° C. or higher.

Ceramic composites in accordance with the ninth invention of this application is characterized in that 3 to 40% by volume of fine TiN particles 2 μm or less in particle size and 3 to 30% by volume of SiC whiskers having a diameter of 0.05 to 2 μm are dispersed in $Al_2O_3$ matrix particles having crystalline grains 0.5 to 100 μm having in grain size.

A method for producing the above ceramic composite in accordance with the tenth invention of this application comprises of mixing $Al_2O_3$ particles 5 μm or less in particle size, 3 to 40% by volume of fine TiN particles 2 μm or less in particle size and 3 to 30% by volume of SiC whiskers having a diameter of 0.05 to 2 μm and then sintering the molding obtained from the resulting mixture at a sintering temperature of 1500° C. or higher.

Ceramic composites in accordance with an eleventh invention of this application are characterized in that 3 to 40% by volume of fine TiN particles 2 μm or less in particle size and 3 to 30% by volume of $Si_3N_4$ whiskers having a diameter of 0.1 to 2 μm are dispersed in $Al_2O_3$ matrix particles having crystalline grains from 0.5 to 100 μm in grain size.

A method for producing the above ceramic composite in accordance with a twelfth invention of this application comprises of mixing $Al_2O_3$ particles 5 μm or less in particle size, 3 to 40% by volume of fine TiN particles 2 μm or less and 3 to 30% by volume of $Si_3N_4$ whiskers having diameter of 0.1 to 2 μm and then sintering the molding obtained from the resulting mixture at a sintering temperature of 1500° C. or higher.

Ceramic composites in accordance with a thirteenth invention of this application are characterized in that 2 to 35% by volume of fine TiC particles 2 μm or less in particle size and 5 to 40% by volume of fine SiC particles 2 μm or less in particle size are dispersed within $Al_2O_3$ matrix particles having crystalline grains 0.5 to 100 μm in grain size.

A method for producing the above ceramic composite in accordance with a fourteenth invention of this application comprises of mixing $Al_2O_3$ particles 5 μm or less in particle size, 2 to 35% by volume of fine TiC particles 2 μm or less in particle size and 5 to 40% by volume of fine SiC particles 2 μm or less in particle size and then sintering the molding obtained from the resulting mixture at a sintering temperature of 1500° C. or higher.

Ceramic composites in accordance with a fifteenth invention are characterized in that 2 to 35% by volume of fine TiC particles 2 μm or less in particle size and 5 to 40% by volume of fine $Si_3N_4$ particles 2 μm or less in particle size are dispersed within $Al_2O_3$ matrix particles having crystalline grains from 0.5 to 100 μm in grain size.

A method for producing the above ceramic composite in accordance with a sixteenth invention of this application comprises of mixing $Al_2O_3$ particles 5 μm or less in particle size, 2 to 35% by volume of fine TiC particles 2 μm or less and 5 to 40% by volume of fine $Si_3N_4$ particles 2 μm or less in particle size and then sintering the molding obtained from the resulting mixture at a sintering temperature of 1500° C. or higher.

According to this invention, the $Al_2O_3$/TiN/SiC composite (material), the $Al_2O_3$/TiN/$Si_3N_4$ composite (material), the $Al_2O_3$/TiC/SiC whisker composite (material), the $Al_2O_3$/TiC/$Si_3N_4$ whisker composite (material), the $Al_2O_3$/TiN/SiC whisker composite (material), the $Al_2O_3$/TiN/$Si_3N_4$ whisker composite (material), the $Al_2O_3$/TiC/SiC composite material, and the $Al_2O_3$/TiC/$Si_3N_4$ composite material having a wide range of practicability as various structural materials can be provided.

The $Al_2O_3$ based composites obtained by the production methods of this invention achieve a drastic improvement in fracture strength and fracture toughness.

The ceramic composites of the invention can provide materials having high strength and high toughness without impairing the properties of $Al_2O_3$.

The ceramic composites of this invention can be obtained by dispersing (1) fine TiN particles and fine SiC particles, (2) fine TiN particles and fine $Si_3N_4$ particles, (3) fine TiC particles and SiC whiskers, (4) fine TiC particles and $Si_3N_4$ whiskers, (5) fine TiN particles and SiC whiskers, (6) fine TiN particles and $Si_3N_4$ whiskers, (7) fine TiC particles and fine SiC particles or (8) fine TiC particles and fine $Si_3N_4$ particles within an alumina matrix whereby the organization is controlled by dispersed particles. As a result, as compared with conventional ceramic composites, the strength can be increased and their mechanical properties improved. To control the organization of this material, the starting materials are mixed (step 1) and the resulting mixture is sintered under optimum conditions (step 2). A material having an organizational structure not obtained heretofore can be obtained. A material is comprised of fine particles having dispersed within the grains of $Al_2O_3$ ceramics in a nanometer schale (i.e., a material composed of crystal grains being complexed in the level of minimum structural unit of ceramic sintering). A dispersed phase (particles, whiskers) is included in each of the particles of the $Al_2O_3$ crystals to make the crystalline particles into a composite. As compared with conventional composite materials, the method of controlling the microstructure and the constituent organization differ, and therefore, an improvement in the mechanical properties is remarkable. Furthermore the strengthening mechanism to be stated below acts and contributes to the improvement of the mechanical properties. By incorporating a dispersed phase such as (1), (2), (3), (4), (5), (6), (7) or (8) having a different physical property (thermal expansion factor) in the $Al_2O_3$ matrix to make a composite, the residual stresses generate between the $Al_2O_3$ and those dispersed fine particles ascribed to the difference in thermal expansion coefficient. Accordingly, compressive stresses generate at the grain boundary between the neighboring $Al_2O_3$ grains. Thus, the cracks inside the sintering are pinned, or sealed or even deflected by those compressive strains. This is the belived mechanism which prevents propagation of crack inside the sintering. Since these stresses form the stresses field through the adjacent particles, shielding or a crack deflection by the induction of a crack arises at its leading edge portion. Furthermore, these stresses act to a great extent locally to generate microcracks in the material. While the cracks propagate, the fracture stress acting on the leading edge is dispersed and mitigated, thus preventing the propagating of the cracks.

Furthermore, since the same stress mechanism is present in the particles dispersed within the $Al_2O_3$ crystalline grains, the same strengthening mechanism which has been impossible heretofore is generated in the particles themselves to manifest a further improvement. A new characteristic is that since the dispersed particles are present inside the matrix, the dispersed particles are not present in the grain boundary portion of the material, and, therefore, defects in the grain boundary which would occur as a result of a decrease in strength do not form. Furthermore, in oxygen diffusion into material in a high-temperature atmosphere, since the diffusion of oxygen is lower in the particles than in the grain boundary, the dispersed particles within matrix are less affected by the influence of oxidation, etc. than those dispersed in the grain boundary, and the degradation of the properties that occurs at high temperatures is greatly inhibited. It is well known that the grain boundary sliding and/or cavitation are responsible for the high-temperature strength degradation of the oxide ceramics. However, the dispersions within the $Al_2O_3$ matrix grains promote the trans granular fracture rather than intergranular. Thus, it is concluded that the increase in strength at high temperature is mainly due to the prohibition of the grain boundary sliding or cavitation by the dispersion within the $Al_2O_3$ matrix grains.

When SiC or $Si_3N_4$ whiskers are dispersed, the pull-out effect of these whiskers or the crack deflecting effect obstructs the propagating of cracks more markedly than in the case of dispersed particles. Furthermore, the addition of particles and whiskers develops a synergistic effect (multi-toughening), and a tougher ceramic composites which have been unable to be obtained by a two-component type can be provided.

PREFERRED EMBODIMENTS

The $Al_2O_3$ crystal grain size in the ceramic composites is limited to 0.5 to 100 μm. This grain size range maximizes the strength of the sintering. The reason why the particle size of fine TiN particles, fine SiC particles, fine TiC particles or fine $Si_3N_4$ particles is limited to not more than 2 μm is that this particle size range is the optimal particle size range to introduce any of the above particles into the $Al_2O_3$ matrix crystalline grains.

The fine particle size range which is especially preferred is 0.01 to 1.0 μm. The diameter of the SiC whiskers is limited to 0.05 to 2 μm, and the diameter of the $Si_3N_4$ whiskers is specified as 0.1 to 2 μm. The reason for this is that diameters within these ranges allow optimal incorporation of these whiskers into the $Al_2O_3$ matrix crystalline grains and have an improved effect.

In accordance with from first to fourth inventions, the reason why the proportion of the fine TiN particles, the fine SiC particles, or fine $Si_3N_4$ particles is limited to 3 to 40% by volume is that if it is less than 3% by volume, the effect of the addition is not fully developed even when these particles are incorporated within the $Al_2O_3$ matrix, and if it is more than 40% by volume, the excess dispersed particles not incorporated within the $Al_2O_3$ matrix are dispersed (existent) in the grain boundary and the characteristics will degrade.

The total proportion of the fine TiN particles and the fine SiC particles or the total proportion of the fine TiN particles and the fine $Si_3N_4$ particles should preferably be 6 to 80%, more preferably 6 to 60%, by volume.

In accordance with from fifth to eighth and from thirteenth to sixteenth inventions, the proportion of the fine TiC particles, the SiC (whiskers or fine particles) or the $Si_3N_4$ (whiskers or fine particles) is limited to 2 to 35% by volume (in the case of TiC) or 5 to 40% by volume (in the case of SiC or $Si_3N_4$). The reason is that if the proportion of TiC is less than 2% by volume or the proportion of SiC or $Si_3N_4$ is less than 5% by volume, the effect of the dispersed particles or whiskers cannot be obtained, and if the proportion of TiC is more than 35% by volume or the proportion of SiC or $Si_3N_4$ is over 40% by volume, the sintering properties are remarkably decreased, and the mechanical properties will be degraded.

The total proportion of the TiC and the SiC or the total proportion of the TiC and the $Si_3N_4$ should preferably be 8 to 60% by volume.

In accordance with from ninth to twelfth inventions, the proportion of the fine TiC particles, the SiC whiskers or the $Si_3N_4$ whiskers is limited to 3 to 40% by volume (in the case of TiN) or 3 to 30% by volume (in the case of whiskers). The reason is that if the proportion of TiN is less than 3% by volume or the proportion of the whiskers is less than 3% by volume, the effect of the dispersed particles or whiskers cannot be obtained, and if the proportion of TiC is more than 40% by volume or the proportion of the whiskers is over 30% by volume, the sintering properties are remarkably decreased, and the mechanical properties will be degraded.

The total proportion of the fine TiN particles and the SiC whiskers or the total proportion of the TiN fine particles and the $Si_3N_4$ whiskers should preferably be 8 to 60% by volume.

The reason why the particle diameter of $Al_2O_3$, used as the manufacturing material, is limited to not more than 5 μm is that they can be easily sintered. The particle size of each of the starting materials TiN, SiC, TiC and $Si_3N_4$ is limited to not more than 2 μm, and the diameter of SiC whisker is limited to 0.05 to 2 μm and the diameter of $Si_3N_4$ whisker is limited to 0.1 to 2 μm. It is easy to take the particles or whiskers into the $Al_2O_3$ matrix particles, and even if the residual stress exceeds a certain limit, microcracks which cause a decrease of strength do not develop. The particles or whiskers may be available from what is now industrially produced.

The matrix $Al_2O_3$ according to the present invention should be minutely sintered in the sintering step. It is necessary that each fine particle or whisker in the dispersed phase within $Al_2O_3$ crystalline grains is uniformly dispersed and becomes particles forming the composites.

In the sintering step, the fine particles or whiskers should be incorporated into the $Al_2O_3$ matrix particles.

The ceramic composite of the present invention is produced by mixing $Al_2O_3$ 5 μm or less in particle size with the dispersed fine particles or both the dispersed fine particles and whiskers and then sintering the molding obtained from the resulting mixture.

The sintering temperature is 1500° C. or, higher, preferably 1500° to 1900° C. The sintering methods suitable for this invention include pressureless sintering, HIP treatment (hot isostatic pressing) and hot pressing.

The ceramic composites obtained by this invention are preferred for high-temperature structural materials such as engine parts and heat-resistant and refractory materials having excellent corrosion resistance, high-temperature strength and thermal shock resistance.

The production of ceramic composites of this invention and the results of measurement of the mechanical properties will be described. The present invention is not limited to the following Examples.

EXAMPLE 1

Preparation of the Sample Powders

AKP-30 (the average particle size 0.3 μm, purity 99.99%) of Sumitomo Chemical Ind. Ltd. was used as the $Al_2O_3$ matrix. Fine TiN (the average size 1.0 μm) particles made by Japan New Metals Co., Ltd. were used as TiN to be added. TiN was added to the matrix material in the proportions shown in Table 1. Furthermore, fine SiC particles (β-random ultrafine: the average particle size 0.3 μm) of Ibiden Co., Ltd. was admixed in the proportions shown in Table 1. They were pulverized and mixed for 24 hours in an alumina ball mill, and then fully dried. After that they were dry pulverized and mixed in an alumina ball mill for 12 hours. The resulting mixture was used as a sample powder.

Sintering Treatment

The sintering treatment was carried out in the high-frequency induction heating hot pressing apparatus (made by Fuji Denpa Kogyo Co., Ltd.). About 80 g of the mixture prepared as shown above was filled into a graphite die (inside diameter 60 mm), precompressed to 10 MPa, and then sintered.

sured values show the following. The sintered body obtained at 1700° C. (No. 6) of an $Al_2O_3$-TiN two-component system had a flexural strength of about 900 MPa on an average. On the other hand, the sintered bodies (Nos. 1 to 5) containing 5 to 30% by volume of fine SiC particles (three-component system) showed a remarkable increase in the fracture strength. When the fractured surfaces of these samples were observed, these surfaces assumed very comlex surfaces. The $Al_2O_3$ had high toughness and strength due to the crack-deflection of the leading edge of the cracks and crack-bowing by the TiN and fine SiC particles dispersed in the $Al_2O_3$ matrix grains and to the generation of microcracks of the dispersed particles in the matrix crystalline grains. The synergistic effect of these is considered to have lead to an improvement in the fracture toughness and strength.

TABLE 1

| No. | Starting material composition (vol. %) | | | Sintering temperature (°C.) | Particle diameter (μm) of α-$Al_2O_3$ in the sintered body | Flexural strength (MPa) | Fracture toughness [$K_{IC}$(MPa m$^{\frac{1}{2}}$)] | Remarks |
| --- | --- | --- | --- | --- | --- | --- | --- | --- |
| | α-$Al_2O_3$ | TiN | SiC | | | | | |
| 1 | 70 | 25 | 5 | 1850 | <3 | 1210 | 7.0 | Example |
| 2 | 80 | 10 | 10 | 1750 | <4 | 1180 | 7.2 | Example |
| 3 | 70 | 20 | 10 | 1800 | <3 | 1280 | 8.0 | Example |
| 4 | 70 | 10 | 20 | 1800 | <3 | 1230 | 7.8 | Example |
| 5 | 65 | 5 | 30 | 1850 | <3 | 1260 | 7.5 | Example |
| 6 | 80 | 20 | — | 1700 | <3 | 930 | 6.0 | Comparative Example |
| 7 | 100 | — | — | 1500 | <5 | 450 | 4.0 | Comparative Example |

The hot pressing condition wherein the powder was heated to the sintering temperature shown in Table 1, was maintained for 1 hour at the temperature. The press pressure was 30 MPa, and nitrogen gas was used as the atmospheric gas.

Formation of a Test Specimen

Both surfaces of the press of the sintered body obtained were ground and finished to a roughness of #1000 by diamond wheel. The sintered body was cut out into a rectangular parallelepiped by a diamond cutter. The sample was cut to a size of 3 mm×4 mm and a length of 36 mm to form a three-point flexural sample.

Measurement of the Mechanical Properties

The grain size of the matrix in the sintered body was measured by observing the microstructure through the fractured surface of the sample by SEM. The flexural strength was measured by a three-point flexural testing method at room temperature at the cross-head speed of 0.5 mm/minute with the span length of 30 mm. This flexural strength was measured with a sample obtained by finishing the tensile surface into a mirror surface using a diamond paste (3 μ) and chamfering the edge portion at an angle of 45° with a width of about 0.1 mm.

The fracture toughness was measured by the IM method under the conditions of indenter boad 9.8N and loading time 10 sec.

Observation of the Results of Measurements

Table 1 shows the relation among the particle diameter of α-$Al_2O_3$ in the sintered body, the three-point flexural strength, the fracture toughness and the added amounts of the TiN and fine SiC particles. These mea-

EXAMPLE 2

AKP-30 (the average particle size 0.3 μm, purity 99.99%) made by Sumitomo Chemical Ind. Ltd. was used as the $Al_2O_3$ matrix, and as TiN to be added, Fine TiN (the average particle size 1.0 μm) particles made by Japan New Metals Co., Ltd. were used. TiN particles were added to the matrix material in each of the proportions shown in Table 2. Furthermore, fine $Si_3N_4$ particles (the average particle size 0.5 μm) made by Shin-Etsu Chemical Co., Ltd. were admixed in each of the proportions shown in Table 2. They were pulverized and mixed for 24 hours in an alumina ball mill. After that, they were fully dried, pulverized and mixed in an alumina ball mill for 12 hours to obtain sample powders.

Using these sample powders, sintered test pieces were prepared as in Example 1, their properties were measured, and the results are shown in Table 2.

Table 2 illustrates the following facts. A sintered body (No. 13) obtained at 1700° C. with an $Al_2O_3$-TiN two-component system had a strength of about 900 MPa on average. In contrast, sintered bodies (Nos. 8~12) containing 5 to 30% by volume of fine $Si_3N_4$ particles (three component system) showed markedly high toughness and strength. When the fractured surfaces of the samples were observed, they assumed very complex surfaces. That $Al_2O_3$ showed high fracture toughness and strength is due to the crack deflection and the crack bowing by the TiN and fine $Si_3N_4$ particles dispersed in the matrix grains and to the formation of microcracks of the dispersed particles in the matrix crystalline grains. The synergistic effect of these is considered to lead to an improvement in the fracture toughness and strength.

TABLE 2

| No. | Starting material composition (vol. %) | | | Sintering temperature (°C.) | Particle diameter (μm) of α-Al₂O₃ in the sintered body | Flexural strength (MPa) | Fracture toughness | Remarks |
|---|---|---|---|---|---|---|---|---|
| | α-Al₂O₃ | TiN | Si₃N₄ | | | | | |
| 8 | 75 | 20 | 5 | 1850 | <4 | 1190 | 7.0 | Example |
| 9 | 70 | 20 | 10 | 1750 | <3 | 1230 | 7.8 | Example |
| 10 | 70 | 15 | 10 | 1800 | <4 | 1240 | 7.6 | Example |
| 11 | 70 | 10 | 20 | 1800 | <3 | 1280 | 7.2 | Example |
| 12 | 65 | 5 | 30 | 1850 | <3 | 1240 | 7.5 | Example |
| 13 | 70 | 30 | — | 1700 | <3 | 960 | 6.0 | Comparative Example |
| 14 | 100 | — | — | 1500 | <5 | 450 | 4.0 | Comparative Example |

EXAMPLE 3

Preparation of Sample Powders

Al₂O₃ UA-5105 (average particle size 0.25 μm, purity 99.99%) made by Showa Keikinzoku Co., Ltd. was used as a matrix, and as the TiC to be added, TiC (#007; average particle size 0.8 μm) was used. TiC was added in each of the proportions shown in Table 3 to the matrix material. Furthermore, SiC whiskers (SCW; diameter 0.05 to 2 μm) made Tateho Chemical Co., Ltd. were admixed in each of the proportions shown in Table 3. They were pulverized and mixed for 12 hours in an alumina ball mill. After that they were fully dried, pulverized and mixed for 5 hours in an alumina ball mill in a dry condition. The resulting mixed powder were used as sample powders.

Sintering

The sintering treatment was carried out in the high frequency induction heating hot pressing apparatus. (made by Fuji Denpa Kogyo Co., Ltd.) About 35 g of the mixture was filled into a graphite die (inside diameter 50 mm), pre-compressed to 10 MPa and sintered. At this time, the filled sample may not directly contact the inner surface of the die and/or the pressing surface of the punching rod and react with them. These surfaces were coated with a BN powder, further, a graphite foil (thickness 0.38 mm) was placed on them, and a sample was filled into it.

The hot pressing conditions included heating the sample to the sintering temperature, and keeping it at that temperature for 1 hour. The pressure was 30 MPa, and argon gas was used as the atmospheric gas.

SAMPLE PREPARATION

It was carried out in the same way as in Example 1.

MEASUREMENT OF PROPERTIES

It was carried out in the same way as in Example 1. The results are shown in Table 3.

OBSERVATION OF THE RESULTS OF MEASUREMENT

The following facts are clear from Table 3.

A sintered body (No. 24) obtained at 1700° C. with an Al₂O₃-TiC two component system had a strength of about 900 MPa on average. On the other hand, sintered bodies (Nos. 15~22) containing 6.2 to 35.4 by volume of SiC whiskers (three component system) showed a large increase in strength. When the fractured surfaces of the samples were observed, they assumed very complex surfaces. That the Al₂O₃ had high fracture toughness is considered to be due to the generation of crack deflection by the addition of TiC and SiC whiskers, thus leading to an improvement in fracture toughness and strength.

TABLE 3

| No. | Starting material composition (vol. %) | | | Sintering temperature (°C.) | Diameter (μm) of particle in the sintered body | | Flexural strength (MPa) | Fracture toughness [K$_{IC}$(MPa m$^{\frac{1}{2}}$)] | Remarks |
|---|---|---|---|---|---|---|---|---|---|
| | α-Al₂O₃ | TiC | SiC whiskers | | α-Al₂O₃ | TiC | | | |
| 15 | 91.4 | 2.4 | 6.2 | 1700 | <5 | <0.8 | 900 | 6.7 | Example |
| 16 | 68.2 | 25.3 | 6.5 | 1800 | <4 | <0.8 | 1250 | 7.5 | Example |
| 17 | 85.4 | 2.4 | 12.2 | 1700 | <4 | <0.8 | 1080 | 7.0 | Example |
| 18 | 62.1 | 25 | 12.9 | 1800 | <3 | <0.8 | 1350 | 9.0 | Example |
| 19 | 73.9 | 2.3 | 23.8 | 1700 | <4 | <0.8 | 1090 | 8.0 | Example |
| 20 | 68.1 | 7.8 | 24.1 | 1800 | <4 | <0.8 | 1220 | 8.7 | Example |
| 21 | 59.5 | 15.9 | 24.6 | 1700 | <3 | <0.8 | 1350 | 9.2 | Example |
| 22 | 57 | 7.6 | 35.4 | 1800 | <3 | <0.8 | 1280 | 9.1 | Example |
| 23 | 74.4 | 25.6 | — | 1700 | <3 | <0.8 | 990 | 6.5 | Comparative Example |
| 24 | 100 | — | — | 1700 | <3 | <0.8 | 450 | 4.0 | Comparative Example |

EXAMPLE 4

Al₂O₃ UA-5105 (average particle size 0.25 μm; purity 99.99%) made by Showa Keikinzoku Co., Ltd. was used as the matrix, and TiC (#007; and average particle size 0.8 μm) made by Japan New Metals Co., Ltd. was used as the TiC to be added. TiC was added to the matrix material in each of the proportions shown in Table 4. Furthermore, Si₃N₄ whiskers (SNW, diameter 0.1 to 2 μm) made by Tateho Chemical Co., Ltd. were admixed in each of the proportions shown in Table 4, and they were pulverized and mixed for 12 hours in an alumina ball mill. Then, they were fully dried, pulverized and mixed for 5 hours in an alumina ball mill in a dry condition. The sample was pulverized.

The sample powders were used and sintered as in Example 3 to form test pieces of sintered bodies. The properties of the test pieces were measured in the same way and the results are shown in Table 4.

The following facts are clear from Table 4.

A sintered body (No. 32) obtained at 1700° C. with an Al₂O₃-TiC two-component system had a strength of about 900 MPa on average. On the other hand, sintered bodies (Nos. 25~31) containing 6.5 to 35.4% by volume containing $Si_3N_4$ whiskers (three component system) showed a large increase in strength. When the fractured surfaces of these samples were observed, very complex surfaces were assumed. Thus, the high fracture toughness of $Al_2O_3$ was due to the generation of crack deflection by the addition of TiC and $Si_3N_4$ whiskers, thus leading to an improvement in fracture toughness and strength.

TABLE 4

| No. | Starting material composition (vol. %) | | | Sintering temperature (°C.) | Diameter (μm) of particle in the sintered body | | Flexural strength (MPa) | Fracture toughness $[K_{IC}(MPa\ m^{\frac{1}{2}})]$ | Remarks |
| --- | --- | --- | --- | --- | --- | --- | --- | --- | --- |
| | α-$Al_2O_3$ | TiC | $Si_3N_4$ whiskers | | α-$Al_2O_3$ | TiC | | | |
| 25 | 68.2 | 25.3 | 6.5 | 1800 | <4 | <0.8 | 1260 | 7.3 | Example |
| 26 | 79.7 | 8 | 12.3 | 1800 | <4 | <0.8 | 1150 | 7.4 | Example |
| 27 | 62.1 | 25 | 12.9 | 1800 | <3 | <0.8 | 1330 | 8.9 | Example |
| 28 | 73.9 | 23 | 23.8 | 1700 | <4 | <0.8 | 1050 | 8.0 | Example |
| 29 | 68.1 | 7.8 | 24.1 | 1800 | <4 | <0.8 | 1230 | 8.5 | Example |
| 30 | 59.5 | 15.9 | 24.6 | 1700 | <3 | <0.8 | 1320 | 9.1 | Example |
| 31 | 57 | 7.6 | 35.4 | 1800 | <3 | <0.8 | 1260 | 9.2 | Example |
| 32 | 74.4 | 25.6 | — | 1700 | <3 | <0.8 | 990 | 6.5 | Comparative Example |
| 33 | 100 | — | — | 1700 | <3 | — | 450 | 4.0 | Comparative Example |

EXAMPLE 5

PREPARATION OF THE SAMPLE POWDERS

AKP-30 (average particle size 0.3 μm, purity 99.99%) of Sumitomo Chemical Ind. Ltd. was used as the $Al_2O_3$ matrix. Fine TiN (average particle size 1.0 μm) particles made by Japan New Metals Co., Ltd. were used as TiN to be added. TiN was added to the matrix material in the proportions shown in Table 5. Furthermore, SiC whiskers (average diameter 0.1~2 μm) of Tateho Chemical Co., Ltd. was admixed in the proportions shown in Table 5. They were pulverized and mixed for 24 hours in an alumina ball mill, and then fully dried. After that they were dry pulverized and mixed in an alumina ball mill for 12 hours. The resulting mixture was used as a sample powder.

SINTERING TREATMENT

The sintering treatment was carried out in the high frequency induction heating hot pressing apparatus (made by Fuji Denpa Kogyo Co., Ltd.). About 80 g of the mixture prepared as shown above was filled into a graphite die (inside diameter 60 mm), pre-compressed to 10 MPa, and then sintered.

The hot pressing condition wherein the powder was heated to the sintering temperature shown in Table 5, was maintained for 1 hour at the temperature. The pressing pressure was 30 MPa, and nitrogen gas was used as the atmospheric gas.

FORMATION OF A TEST SPECIMEN

Both surfaces of the press of the sintered body obtained were ground and finished to a roughness of #1000 by diamond wheel. The sintered body was cut out into a rectangular parallelepiped by a diamond cutter. The sample was cut to a size of 3 mm×4 mm and a length of 36 mm to form a three-point flexural sample.

MEASUREMENT OF MECHANICAL PROPERTIES

The grain size of the matrix in the sintered body was measured by observing the microsfructure through the fractured surface of the sample by SEM. The flexural strength was measured by a three-point flexural testing method at room temperature at the cross-head speed of 0.5 mm/minute with the span length of 30 mm. This flexural strength was measured with a sample obtained by finishing the tensile surface into a mirror surface using a diamond paste (3μ) and chamfering the edge portion at an angle of 45° with a width of about 0.1 mm.

The fracture toughness was measured by the IM method under the conditions of indenter load 9.8N and loading time at 10 sec.

OBSERVATION OF THE RESULTS OF MEASUREMENTS

Table 5 shows the relation among the grain size of α-$Al_2O_3$ in the sintered body, the three-point flexural strength, the fracture toughness, and the added amounts of the fine TiN particles and SiC whiskers. These measured values show the following. The sintered body obtained at 1700° C. (No. 38) of a $Al_2O_3$-TiN two-component system had a flexural strength of about 900 MPa on an average. On the other hand, the sintered bodies (Nos. 34 to 37) containing 3 to 30% by volume of the SiC whiskers (three-component system) showed a remarkable increase in the strength. When the fractured surfaces of these samples were observed, these surfaces assumed very complex surfaces. That $Al_2O_3$ had high toughness and strength was due to the crack deflection and crack bowing by the fine TiN particles and SiC whiskers dispersed in the $Al_2O_3$ matrix grains and to the generation of microcracks of the dispersed particles in the $Al_2O_3$ matrix crystalline grains. The synergistic effect of these is considered to have lead to an improvement in fracture toughness and strength.

TABLE 5

| No. | Starting material composition (vol. %) | | | Sintering temperature (°C.) | Particle diameter (μm) of α-$Al_2O_3$ in the sintered body | Flexural strength (MPa) | Fracture toughness $[K_{IC}(MPa\ m^{\frac{1}{2}})]$ | Remarks |
| --- | --- | --- | --- | --- | --- | --- | --- | --- |
| | α-$Al_2O_3$ | TiN | SiC whiskers | | | | | |
| 34 | 70 | 27 | 3 | 1850 | <4 | 1150 | 8.1 | Example |
| 35 | 70 | 20 | 10 | 1750 | <4 | 1160 | 8.3 | Example |
| 36 | 70 | 10 | 20 | 1800 | <3 | 1210 | 8.9 | Example |
| 37 | 65 | 5 | 30 | 1800 | <3 | 1250 | 9.1 | Example |
| 38 | 80 | 20 | — | 1700 | <3 | 930 | 6.0 | Comparative Example |

TABLE 5-continued

| No. | Starting material composition (vol. %) | | | Sintering temperature (°C.) | Particle diameter (μm) of α-$Al_2O_3$ in the sintered body | Flexural strength (MPa) | Fracture toughness [$K_{IC}$(MPa m$^{\frac{1}{2}}$)] | Remarks |
|---|---|---|---|---|---|---|---|---|
| | α-$Al_2O_3$ | TiN | SiC whiskers | | | | | |
| 39 | 100 | — | — | 1500 | <5 | 450 | 4.0 | Comparative Example |

EXAMPLE 6

AKP-30 (the average particle size 0.3 μm, purity 99.99%) made by Sumitomo Chemical Ind. Ltd. was used as the $Al_2O_3$ matrix, and as TiN to be added, fine TiN (the average particle size 1.0 μm) particles made by Japan New Metals Co., Ltd. were used. TiN particles were added to the matrix material in each of the proportions shown in Table 6. Furthermore, $Si_3N_4$ whiskers (average diameter 0.1~2 μm) made by Tateho Chemical Co., Ltd. were admixed in each of the proportions shown in Table 6. They were pulverized and mixed for 24 hours in an alumina ball mill. After that, they were fully dried, pulverized and mixed in an alumina ball mill for 12 hours to obtain sample powders.

Using these mixture, sintered test piece were prepared as in Example 5, their properties were measured, and the results are shown in Table 6.

Table 6 illustrates the following facts. A sintered body (No. 44) obtained at 1700° C. with an $Al_2O_3$-TiN two-component system had a strength of about 900 MPa on average. In contrast, sintered bodies (Nos. 40~43) containing 3 to 30% by volume of $Si_3N_4$ whiskers (three component system) showed markedly high fracture toughness and strength. When the fractured surfaces of the samples were observed, they assumed very complex surfaces. That $Al_2O_3$ showed high fracture toughness and strength is due to the crack deflection and the crack bowing by the fine TiN particles and $Si_3N_4$ whiskers dispersed in the matrix grains and to the formation of microcracks of the dispersed particles in the $Al_2O_3$ matrix crystalline grains. The synergistic effect of these is considered to lead to an improvement in fracture toughness and strength.

in each of the proportions shown in Table 7. They were pulverized and mixed for 12 hours in an alumina ball mill. After that they were fully dried, pulverized and mixed for 5 hours in an alumina ball mill in a dry condition. The resulting mixture was used as sample powders.

Sintering

The high frequency induction heating-type hot pressing apparatus (made by Fuji Denpa Kogyo Co., Ltd.) was used for the sintering treatment. About 35 g of the prepared sample powder was filled into a graphite die (inside diameter 50 mm), pre-compressed to 10 MPa. At this time, the filled mixture may not directly contact the inner surface of the die and/or the pressing surface of the punching rod and react with them. These surfaces were coated with a BN powder, further, a graphite foil (thickness 0.38 mm) was placed on them, and the mixture was filled into it.

The hot pressing conditions included heating the sample to the sintering temperature, and keeping it at that temperature for 1 hour. The pressure was 30 MPa, and argon gas was used as the atmospheric gas.

Sample Preparation

It was carried out in the same way as in Example 5.

Measurement of Properties

It was carried out in the same way as in Example 5. The results are shown in Table 7.

Observation of the Results of Measurement

The following facts are clear from Table 7.

A sintered body (No. 51) obtained at 1700° C. with an $Al_2O_3$-TiC two component system had a strength of

TABLE 6

| No. | Starting material composition (vol. %) | | | Sintering temperature (°C.) | Particle diameter (μm) of α-$Al_2O_3$ in the sintered body | Flexural strength (MPa) | Fracture toughness [$K_{IC}$(MPa m$^{\frac{1}{2}}$)] | Remarks |
|---|---|---|---|---|---|---|---|---|
| | α-$Al_2O_3$ | TiN | $Si_3N_4$ whiskers | | | | | |
| 40 | 70 | 27 | 3 | 1800 | <4 | 1230 | 7.8 | Example |
| 41 | 70 | 20 | 10 | 1800 | <4 | 1180 | 8.5 | Example |
| 42 | 70 | 10 | 20 | 1800 | <4 | 1210 | 8.8 | Example |
| 43 | 65 | 5 | 30 | 1800 | <3 | 1280 | 9.0 | Example |
| 44 | 70 | 30 | — | 1700 | <3 | 960 | 6.0 | Comparative Example |
| 45 | 100 | — | — | 1500 | <5 | 450 | 4.0 | Comparative Example |

EXAMPLE 7

Preparation of Sample Powders $Al_2O_3$ UA-5105 (the average particle diameter 0.25 μm, purity 99.99%) made by Showa Keikinzoku Co., Ltd. was used as a matrix, and as the fine TiC to be added, TiC (#007; average particle size 0.8 μm) was used. TiC was added in each of the proportions shown in Table 7 to the matrix material. Furthermore, fine SiC particles β-randum ultrafine; average particle size 0.3 μm) made by Ibiden Chemical Co., Ltd. were admixed about 900 MPa on average. On the other hand, sintered bodies (Nos. 46~50) containing 6.5 to 24.5% by volume of SiC fine particles (three component system) showed a large increase in strength. When the fractured surfaces of the samples were observed, they assumed very complex surfaces. That the $Al_2O_3$ had high fracture toughness is considered to be due to the generation of crack deflection by the addition of TiC and SiC fine particles, thus leading to an improvement in fracture toughness and strength.

TABLE 7

| No. | Starting material composition (vol. %) α-Al₂O₃ | TiC | SiC | Sintering temperature (°C.) | Diameter (μm) of particle in the sintered body α-Al₂O₃ | Flexural strength (MPa) | Fracture toughness [K$_{IC}$(MPa m$^{\frac{1}{2}}$)] | Remarks |
|---|---|---|---|---|---|---|---|---|
| 46 | 68.2 | 25.3 | 6.5 | 1700 | <3 | 1210 | 7.1 | Example |
| 47 | 79.7 | 8.0 | 12.3 | 1700 | <4 | 1180 | 7.2 | Example |
| 48 | 71.1 | 16.3 | 12.6 | 1800 | <4 | 1220 | 7.9 | Example |
| 49 | 68.1 | 7.8 | 24.1 | 1700 | <4 | 1230 | 7.8 | Example |
| 50 | 59.5 | 16.0 | 24.5 | 1800 | <3 | 1260 | 7.7 | Example |
| 51 | 74.4 | 25.6 | — | 1700 | <3 | 930 | 6.0 | Comparative Example |
| 52 | 100 | — | — | 1700 | <3 | 450 | 4.0 | Comparative Example |

EXAMPLE 8

Al₂O₃ UA-5105 (the average particle size 0.25 μm; purity 99.99%) made by Showa Keikinzoku Co., Ltd. was used as the matrix, and TiC (#007; and the average particle size 0.8 μm) made by Japan New Metals Co., Ltd. was used as the TiC to be added. TiC was added to the matrix material in each of the proportions shown in Table 8. Furthermore, Si₃N₄ fine particles (the average particle size 0.3 μm) made by Shinetsu Chemical Co., Ltd. were admixed in each of the proportions shown in Table 8, and they were pulverized and mixed for 12 hours in an alumina ball mill. Then, they were fully dried, pulverized and mixed for 5 hours in an alumina ball mill in a dry condition. The sample was pulverized.

The sample powders were used and sintered as in Example 7 to form test pieces of sintweed bodies. The properties of the test pieces were measured in the same way and the results are shown in Table 8.

The following facts are clear from Table 8.

A sintered body (No. 58) obtained at 1700° C. with an Al₂O₃-TiC two-component system had a strength of about 900 MPa on average. On the other hand, sintered bodies (Nos. 53~57) containing 6.4 to 35.4% by volume containing Si₃N₄ fine particles (three component system) showed a large increase in strength. When the fractured surfaces of these samples were observed, very complex surfaces were assumed. Thus, the high fracture toughness of Al₂O₃ was due to the generation of crack deflection by the addition of TiC and Si₃N₄ particles, thus leading to an improvement in fracture toughness and strength.

What is claimed is:

1. Ceramic composites consisting essentially of 2 to 35% by volume of fine TiC particles having a particle size of not more than 2 micro meter, 5 to 40% by volume of Si₃N₄ whiskers having a diameter of 0.1 to 2 micro meter and Al₂O₃ as a matrix having crystalline grains with a grain size of 0.5 to 100 micro meter, said TiC particles and Si₃N₄ whiskers being dispersed in the crystalline grains of Al₂O₃.

2. Ceramic composites according to claim 1, wherein said particle size of said TiC particles is between 0.01 and 1.0 micro meters.

3. A method of producing ceramic composites which comprises mixing Al₂O₃ particles having a particle size of not more than 5 μm with 2 to 35% by volume of fine TiC particles having a particle size of not more than 2 μm and 5 to 40% by volume of Si₃N₄ whiskers having a diameter of 0.1 to 2 μm, molding the resulting mixture and sintering it at a temperature of at least 1500° C.

4. Ceramic composites consisting essentially of 2 to 35% by volume of fine TiC particles having a particle diameter of not more than 2 micro meter, 5 to 40% by volume of fine SiC particles having a particle size of not more than 2 micro meter and Al₂O₃ as a matrix having crystalline grains with a grain size of 0.5 to 100 micro meter, said TiC particles and SiC particles being dispersed in the crystalline grains of Al₂O₃.

5. Ceramic composites according to claim 4, wherein said particle sizes of said TiC and SiC particles are between 0.01 and 1.0 micro meters.

6. A method of producing ceramic composites which comprises mixing Al₂O₃ particles having a particle size of not more than 5 μm with 2 to 35% by volume of fine TiC particles having a particle size of not more than 2 μm and 5 to 40% by volume of fine SiC particles having a particle size of not more than 2 μm, molding the resulting mixture, and sintering it at a temperature of at least 1500° C.

TABLE 8

| No. | Starting material composition (vol. %) α-Al₂O₃ | TiC | Si₃N₄ | Sintering temperature (°C.) | Diameter (μm) of particle in the sintered body α-Al₂O₃ | Flexural strength (MPa) | Fracture toughness [K$_{IC}$(MPa m$^{\frac{1}{2}}$)] | Remarks |
|---|---|---|---|---|---|---|---|---|
| 53 | 77.1 | 16.5 | 6.4 | 1700 | <4 | 1190 | 7.0 | Example |
| 54 | 71.1 | 16.3 | 12.6 | 1800 | <4 | 1230 | 7.1 | Example |
| 55 | 69.5 | 12 | 18.5 | 1800 | <4 | 1240 | 7.2 | Example |
| 56 | 63.8 | 11.8 | 24.4 | 1700 | <3 | 1250 | 7.7 | Example |
| 57 | 57 | 7.6 | 35.4 | 1700 | <3 | 1260 | 7.8 | Example |
| 58 | 74.4 | 25.6 | — | 1700 | <3 | 990 | 6.5 | Comparative Example |
| 59 | 100 | — | — | 1700 | <3 | 450 | 4.0 | Comparative Example |

* * * * *